United States Patent
Miled et al.

(10) Patent No.: US 12,519,855 B2
(45) Date of Patent: Jan. 6, 2026

(54) METHOD FOR RUNTIME-BASED CONFIGURATION OF A DEVICE-INTERNAL SIGNAL TRANSMISSION IN A CONTROL DEVICE, AND CORRESPONDINGLY OPERABLE CONTROL DEVICE AND MOTOR VEHICLE

(71) Applicant: AUDI AG, Ingolstadt (DE)

(72) Inventors: Hatem Miled, Ingolstadt (DE); Konrad Häublein, Erlangen (DE); Robert Rasche, Ingolstadt (DE); Usam Sersultanov, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 106 days.

(21) Appl. No.: 18/565,908

(22) PCT Filed: May 20, 2022

(86) PCT No.: PCT/EP2022/063671
§ 371 (c)(1),
(2) Date: Nov. 30, 2023

(87) PCT Pub. No.: WO2022/253589
PCT Pub. Date: Dec. 8, 2022

(65) Prior Publication Data
US 2024/0380816 A1 Nov. 14, 2024

(30) Foreign Application Priority Data
Jun. 2, 2021 (DE) ...................... 10 2021 114 282.2

(51) Int. Cl.
*H04L 67/00* (2022.01)
*H04L 45/24* (2022.01)
(Continued)

(52) U.S. Cl.
CPC .............. *H04L 67/12* (2013.01); *H04L 45/24* (2013.01); *H04L 49/9021* (2013.01)

(58) Field of Classification Search
CPC ...................................... H04L 67/12
See application file for complete search history.

(56) References Cited

U.S. PATENT DOCUMENTS

2020/0294401 A1* 9/2020 Kerecsen ............... G08G 1/205
2020/0389469 A1* 12/2020 Litichever ............. H04W 12/12
2022/0343699 A1* 10/2022 Schmid .................. G07C 5/085

FOREIGN PATENT DOCUMENTS

DE         101 25 421 A1    5/2001
DE    10 2016 223 540 A1    5/2018
(Continued)

OTHER PUBLICATIONS

International Search Report dated Sep. 26, 2022 for International Application No. PCT/EP2022/063671.
(Continued)

*Primary Examiner* — Tammara R Peyton
(74) *Attorney, Agent, or Firm* — STAAS & HALSEY LLP (57) ABSTRACT

Disclosed herein is a method for the runtime-based configuration of device-internal signal transmission in a control device, wherein in an AUTOSAR-compliant runtime environment, upon start-up of the control device, publisher components each provide at least one publisher list of the signals provided by them and subscriber components each provide at least one subscriber list of the signals required by them. For each subscriber component, for the signals required by said component, it is determined which signal path from one of the publisher components to the subscriber component the respective signal must take through the control device for given publisher lists, and from those required signals for which an identical signal path is iden- (Continued)

tified, a signal group is defined by storing a common transmission command in the runtime environment for the signals of the respective signal group.

20 Claims, 3 Drawing Sheets

(51) Int. Cl.
  *H04L 49/90* (2022.01)
  *H04L 67/12* (2022.01)

(56) References Cited

FOREIGN PATENT DOCUMENTS

DE   10 2021 114 282.2     6/2021
WO   PCT/EP2022/063671    5/2022

OTHER PUBLICATIONS

German Office Action dated Dec. 3, 2021 for German Application No. 10 2021 114 282.2.

"Transmission Control Protocol"; Wikipedia, The Free Encyclopedia. URL: https://en.wikipedia.org/w/index.php?title=Transmission_Control_Protocol&oldid=1024653310 [retrieved on Feb. 12, 2021], 20 pages.

"User Datagram Protocol"; Wikipedia, The Free Encyclopedia. URL: https://en.wikipedia.org/w/index.php?title=User_Datagram_Protocol&oldid=1016748052 [retrieved on Feb. 12, 2021], 5 pages.

Stallman, R. M. et al.: uniq(1)—Linux manual page, GNU coreutils 8.32, Mar. 2020. URL: https://man7.org/linux/man-pages/man1/uniq.1.html [retrieved on Feb. 12, 2021], 3 pages.

"Hash function"; Wikipedia, The Free Encyclopedia. URL: https://en.wikipedia.org/w/index.php?title=Hash_function&oldid=1025584973 [retrieved on Feb. 12, 2021], 14 pages.

Arestova et al.: "A Service-Oriented Real-Time Communication Scheme for AUTOSAR Adaptive Using OPC US and Time-Sensitivi Networking" Sensors, vol. 21, No. 7, Mar. 27, 2021, 29 pages.

Norm AUTOSAR FO Release 1.1.0 Mar. 31, 2017, Document ID 696. SOME/IP Protocol Specification, 58 pages.

English translation of International Preliminary Report on Patentability dated Dec. 14, 2023 from International Patent Application No. PCT/EP2022/063671.

* cited by examiner

METHOD FOR RUNTIME-BASED CONFIGURATION OF A DEVICE-INTERNAL SIGNAL TRANSMISSION IN A CONTROL DEVICE, AND CORRESPONDINGLY OPERABLE CONTROL DEVICE AND MOTOR VEHICLE

CROSS REFERENCE TO RELATED APPLICATIONS

This application is a U.S. national stage of International Application No. PCT/EP2022/063671, filed on May 20, 2022. The International Application claims the priority benefit of German Application No. 10 2021 114 282.2 filed on Jun. 2, 2021. Both the International Application PCT/EP2022/063671 and the German Application 10 2021 114 282.2 are incorporated by reference herein in their entirety.

BACKGROUND

Described below is a method for a runtime-based configuration of a device-internal signal transmission in an electronic control device. By signal transmission, software components of the control device exchange the signal data of signals in a cyclical manner. Signal transmission is configured in a runtime environment in accordance with the AUTOSAR standard at start-up (boot-up, power-up) of the control device. An aspect of the invention also comprises an appropriately operable control device and a motor vehicle having such a control device.

AUTOSAR (Automotive Open System Architecture), developed by the AUTOSAR consortium, is a description of, inter alia, a basic software architecture for control units (or control devices) in the field of automotive technology. AUTOSAR provides software modules or software components that implement individual functional components of the control device. These interact to ultimately provide full device functionality. To achieve this, the components exchange signals. The individual signal data of the signals is transmitted between the components by a runtime environment (RTE) or RTE transmission device. According to the AUTOSAR communication structure, the components exchange signal data of a given signal with each other in pairs. To this end, one component of the component pair provides the signal data (publisher component or sending component) and the other component of the component pair reads in the signal data (subscriber component or receiving component). The RTE transmission device is capable of transmitting signals from a sending component to one or more receiving components or none. Thus, a component can provide its signal data to multiple other components, resulting overall in a 1-to-N relationship in the communication.

An electronic control unit (ECU), or electronic control device, can simultaneously perform a plurality of functions to control and/or regulate technical systems and other processes (commonly referred to as a "section"). In this case, measurement data from measurement sources ("measured values") is repeatedly read into the processor system of the control device, processed ("internal signals") and output to actuators ("control variables"). The individual functions are described with technical requirements and created in processes ("function development"/"software development"), tested and finally delivered as modular units in the form of stand-alone "software components" that interact and/or cooperate with each other by signal exchange. There are also overarching requirements and an overarching development process through which the individual software components are combined with "base software" to form an overall system ("software integration process").

Both in the software development process and in the software integration process, the signals in a control device are described and their propagation path in the control device is defined. By manual or implicit configuration, a software module for subsequent signal transmission (at runtime) is created, which defines when and in which memory area of the control device the signal data is stored and read at runtime. This software module also contains the implementation for the program interfaces used by the function modules.

One method for the implicit configuration of this software layer is the so-called Publish/Subscribe method "Pub/Sub" (see the unexamined application DE 10 2016 223 540 A1). Signals are assigned a globally valid identification ("Signal ID", "Topic", "Pub/Sub-ID") so that they can be referenced identically by all software components. As part of each software component, lists with identifications of all input signals required ("subscriber list") and all output signals provided ("publisher list") are added. These lists can be used to very easily describe the signal interfaces of a software component completely ("component header", "pub/sub-header").

When the control device is started, based on this description the signal propagation paths (hereafter also referred to as "signal paths") are created automatically as follows. First, a software routine checks all publish and subscribe entries of all components and compares them with each other. For each subscribe entry, the associated publish entry is identified and linked, for example, by a memory reference. At system runtime, each signal is then copied from the memory area ("Publish buffer", "Output buffer", "Source") reserved by the referenced producer (software component that generates the signal data=Publisher component) to the memory area ("Subscribe buffer", "Input buffer", "Sink") reserved by the respective consumer (software component that reads in the signal data=Subscriber component). The copying takes place in each execution cycle before the function code of the respective consuming software component is called. This can occur every 0.1 milliseconds to 10 seconds. A control device may contain multiple processor systems ("System on Chip", "SoC", "computing nodes") that execute stand-alone operating-system and base software instances and portions of the application software as software components. A node cannot access the memory of another node directly.

The processor systems can additionally be connected to a data network within the control device for the purpose of mutual data communication, e.g. a fieldbus system or a packet-based transmission network (e.g. Ethernet). Signal data is transmitted using a fieldbus or network protocol. In this case, the signal data is embedded in a data packet, which is usually transmitted and received by stand-alone hardware units that work asynchronously with respect to the main processor of the respective computing node. This requires synchronization of transmission processes and execution of the function software. If linked software components are to be executed on different nodes of the control device, signal data transmission between these nodes will be required. In classical non-Pub/Sub-based systems, this signal transmission is carried out using a fieldbus or networking system and on the basis of an explicit configuration that describes which transmission must take place on which channel and when (so-called "K matrix"). In the context of Pub/Sub, however, no pre-defined K matrix can be specified that is valid independently of the software components, because it is not until the control device is started (at boot-up) that it becomes known which publisher lists and subscriber lists are generated. Rather, the K-matrix description results from the requirements of a given constellation of software components on the computing nodes of the distributed system in the control device.

One problem with the Pub/Sub method described is that many individual signal relationships occur (typically around 15,000 pairs), which means that a corresponding number of memory references must be reserved and a corresponding number of signal transmissions must be carried out at runtime. Greater demand is placed on memory and processor time resources than would be required without using the Pub/Sub method.

The disadvantage is further magnified when signals need to be transmitted between multiple computing nodes of a control device, because in addition to the memory reference and copying process, considerable additional resources are then required to implement signal data transmission via a network or a fieldbus. This includes additional storage for creating the data packet and additional transmission time for sending and receiving the packet. With the classical Pub/Sub method, the additional expenditure is proportional to the number of signals to be transmitted.

The idea described in this description can be used, for example, as a continuation of the already published document DE 10 2016 223 540 A1. It describes how in an AUTOSAR RTE environment of a control device a Publish-Subscribe method can be applied for the transmission of signal data between software components of the control device.

The use of the Publish-Subscribe method in an AUTOSAR RTE environment of a CAN bus system is also described in the scientific paper by Janitzek et al. (Emil M. Janitzek, Markus P. Ljungblad: "Exploring variation mechanisms in the automotive industry—A case study," 2010, Bachelor thesis, URL: https://gupea.ub.gu.se/handle/2077/23469).

From document DE 101 25 421 A1 it is known to combine different signals into signal groups in a CAN bus system in order to be able to transmit their signal data simultaneously in a common frame in the CAN bus. Grouping is used for signal transmission at the level of networking multiple control devices with a fieldbus system. However, for the purpose of grouping, the method uses static local signal properties, in particular the signal priority, which are already stored on each of the control devices. Dynamic grouping is not possible at the start-up of the control devices.

The transmission of data packets in AUTOSAR can be carried out using the SOME/IP protocol (AUTOSAR FO standard, Release 1.1.0 2017-03-31, Document ID 696. SOME/IP Protocol Specification). This protocol uses data networks with the protocols TCP (Transmission Control Protocol) and UDP (User Datagram Protocol) for transmission between control devices. At the network level, bindings must allow multiple data packets per UDP network packet.

SUMMARY

An aspect of the invention is to efficiently implement an AUTOSAR runtime environment (RTE) for the exchange of signals between software components in a control device of a motor vehicle.

One aspect according to the invention is a method for the runtime-based configuration of a device-internal signal transmission in an electronic control unit (ECU), or electronic control device. The method can be carried out by a processor circuit of the control device. This means that it can run internally to the unit (or device). In a runtime environment (in particular AUTOSAR compliant), at start-up of the control device (that is, during booting or powering up and thus runtime-based), publisher components each provide at least one publisher list of the signals provided by them and subscriber components each provide at least one subscriber list of the signals required by them. A respective publisher component and subscriber component can be implemented or programmed as a software component which is executed on a processor circuit of the control device. Such a software component comprises one or more executable functions (runnable entities, runnables). For the sake of clarity, this document describes that there is one publish/subscribe list per software component, but aspects of the invention also include the case in which there can be a list for each of the functions of the software component. A module/software component can namely consist of multiple functions/runnables (e.g. 1×Init plus 1×10 ms cyclically plus other event-driven functions). In practice/in common usage, the cyclic runnable is often equated with the functionality of the component (a 1:1 relationship of component-to-cyclic-runnable). However, each function/runnable can function as a participant in the signal communication, i.e. each function/runnable has its own identity (ID) and can provide its own publish and/or subscribe list.

These software components can use the signals to exchange signal data. The current signal data describes the respectively current section of the signal. Examples of signals are: a rotation speed of a wheel of the motor vehicle, a temperature profile over time, a driving speed over time, a status of at least one device of a motor vehicle, such as a parking brake. A signal can therefore be a current state of a vehicle component (input signal) and/or a control signal for a vehicle component (output signal) and/or a calculation result (processing signal).

The control device does not need to be hard-coded during production to specify which signal data is to be transmitted from which publisher component to which subscriber component in the runtime environment. Rather, this configuration is performed dynamically at start-up or power-up or boot-up of the control device depending on the resulting publisher lists or subscriber lists.

In order to increase efficiency, an aspect of the invention seeks to prevent each signal from being individually transmitted from a publisher component to a subscriber component by the runtime environment. As described above, this typically results in 15,000 component pairs, which would cause a corresponding signal transmission overhead.

For each subscriber component it is therefore determined, for the signals it requires, which signal path from one of the publisher components to the subscriber component the respective required signal must take through the control device for given publisher lists. From the required signals, for those of the required signals for which an identical signal path is identified, a signal group is defined by storing a common transmission command in the runtime environment for the signals of the respective signal group. The transmission command thus transmits the current signal data of multiple signals of the same signal group together (for example, in the case of cyclic transmission at periodic transmission times, e.g. in the range of every 100 μs to 30 s). In the cyclical execution of the stored transmission commands of the subscriber components by the runtime environment, current signal data of the signals of each signal group is therefore transmitted as a common data packet from the respective publisher component to the respective subscriber component of the signal group. Thus, if a subscriber component receives multiple signals from the same publisher component, this is identified or detected, and the signal data of these signals, which have the same signal path, is transmitted together as a data packet of a signal group at each transmission cycle or at each transmission time.

An aspect of the invention produces the advantage that, for the transmission of multiple signals which have the same signal path and therefore represent a signal group, only a single transmission command in the runtime environment can suffice, instead of an individual transmission command per signal. Such a transmission command may, for example, be a copy command to copy the current signal data from multiple signals of the signal group, for example, the current rotation speed of a wheel and a current temperature of a brake caliper and a brake pressure, as a common data packet from an output buffer of the corresponding publisher component to an input buffer of the receiving subscriber component. The copy command can use, for example in a data memory, an address of a start or beginning of the output buffer in which the data packet is located and a size of the output buffer (number of bytes of the data packet to be copied) as parameters. Based on the start address and the size of the output buffer, the data packet with the signal data of the entire signal group is then transmitted by a copy operation or, in general, a transmission operation. Such a transmission can take place, for example, by DMA (Direct Memory Access). Combining signals of the same signal path in a signal group therefore results in fewer transmission commands, for example, fewer copy commands, so that correspondingly less overhead is incurred for initiating and/or managing the transmission commands and/or transmission operations in the control device. This increases the efficiency of signal transmission between the software components.

Aspects of the invention also include refinements which result in additional advantages.

One refinement comprises multiple computing nodes that are operated in the control device, which are connected via a data network. Another term for computing node is computation node, or simply node. Examples of a computing node are a microprocessor and an SoC (system-on-chip). Examples of a data network within a control device are a bus system and an Ethernet network. An example of a bus system is a PCIe system bus. The data network may in particular be different from an external data network to which the control device in the motor vehicle can be connected.

Signal paths can also extend between two computing nodes when a subscriber component is executed on a different computing node than the publisher component that requires signals. However, the signal paths that extend between the computing nodes can belong not only to one signal group, but also to multiple signal groups. Therefore, multiple signal paths are identified that lead from the same computing node, as source node, to the same other computing node, as the target node. These signal paths can belong to one or more signal groups. For these identified signal paths, a collection buffer is provided in the source node and a distribution buffer is provided in the target node and the current signal data for each of the multiple signal paths identified is collected in the collection buffer and transmitted in a common network packet to the distribution buffer and transmitted from the distribution buffer onward to the at least one subscriber component determined by the identified signal paths. A source node and a target node thus each constitute a computing node, wherein at least one publisher component for at least one of the identified signal paths exists or is executed on a source node and at least one subscriber component for receiving at least one of the signal paths exists or is executed on the target node. The collection buffers and the distribution buffers can be provided either for a single signal group or for multiple signal groups, if these must be transmitted from the same source node to the same destination node. This means that the data packets of multiple signal groups can be collected in a collection buffer and transmitted over the data network together as a network packet to the distribution buffer of the same target node. A collection buffer and a distribution buffer can be created or operated, for example, in a RAM of the respective computing node. From the distribution buffer of the target node, the data packets of the individual signal groups can then be transmitted separately from each other again to the respective subscriber component. Thus, during transmission over the data network, signal data can be combined into a common network packet, which reduces the overhead involved in managing or organizing network traffic on the data network, making the transmission more efficient than transmitting individual data packets.

The determination of a single signal group, i.e. the identification of common signal paths between a publisher component and a subscriber component in each case, can be realized with simple software code, which saves computing resources in the control device and shortens the start-up time.

A refinement additionally comprises that, for determining the signal groups for each of the signal paths, a signal path tag is constructed as a data word (data word=byte sequence of fixed length), which specifies the publisher component in a first bit field, the respective computing nodes on which the subscriber components are executed in a second bit field, and the subscriber components in a third bit field. In the second bit field, a computing node on which the publisher component is executed can also be specified. The signal path tags of all signal paths are sorted in a data memory by a sorting procedure (or algorithm) and sections having identical signal path tags, or sections in which a predetermined part of the signal path tags matches, are then identified in the data memory, which are then used to define one of the signal groups in each case. Each signal path tag has three sections or bit fields. The resulting data word can also be interpreted as an integer, so that the data words allow for sorting by a sorting procedure using known criteria, e.g. "greater than" and/or "less than". An example of such a sorting procedure is Quick-Sort. By defining the data word and sorting the resulting data words, it can be detected automatically by the processor circuit of the control device which signal groups are obtained.

In an example of the invention, bit fields may have a constant or fixed size, so that during sorting the fields contain the same place value or the same weighting depending on their position in the data word. A refinement additionally comprises that, to form at least one of the bit fields a hash procedure (or algorithm) is used, which always generates an output of the same length regardless of the number of inputs. One such hash procedure could be the XOR hash, for example. By using a hash procedure, it is possible to ensure that the output, i.e. the resulting bit field, is the same length or always has the same length, irrespective of the length or number of bytes of the input value as input. The "hash" method is used in particular for merging individual items of information from multiple subscriber components/runnables. An ID "hash" of a software component/runnable can be considered as "information" (each runnable has an ID that can be derived from the node number and the start address of the function in ROM). The information from multiple subscriber components for the signal can be added together (e.g. bitwise XOR or addition (mod 2^15) or another procedure) to determine an identifier for exactly this set of subscriber components, i.e. set-ID is the XOR sum of all IDs of the set elements. The other bit fields do not necessarily have to be treated with such a hashing procedure, but instead can be determined differently (the node mask/the second bit field can be aggregated e.g. with bitwise OR (bit mask) and/or the publisher tag/the third bit mask can be left alone). Thus, depending on the information or the data about publisher components, the first bit field can always be selected or set to the same length using the hash procedure. The same applies to the second bit field and the third bit field and further bit fields.

Once the signal groups are known, the runtime environment must also be able to be set up or configured automatically. Unlike in the case of a configuration during laboratory production, however, in a control device that is already being operated in a motor vehicle, it is not initially clear at start-up how much memory must be allocated for how many signal groups and how large each signal group is. This is only obtained from the described examination or evaluation of the publisher lists and subscriber lists. A refinement comprises as a solution that, for each identified signal group, an output buffer for the associated publisher component and an input buffer for the associated subscriber component are allocated in a data memory and the publisher component writes respective current signal data of the signal group cyclically into the output buffer and the respective current data packet is thus generated in the output buffer. The runtime environment transmits the data packet to the input buffer of the subscriber component and the subscriber component can read in the signal data of the data packet from its input buffer, i.e. it is provided with the signal data for reading in (whether it actually reads in the signal data can depend, for example, on an internal state of the subscriber component). Thus, the memory management for the transmission of signal data from the respective output buffers of the publisher components to the input buffers of the subscriber components can also be automated.

Two possible refinements relate to the structuring or division of the data packets in which the current signal data of a signal group is transmitted.

A refinement comprises that, in the case of at least one signal group, in the data packets thereof the signal data of the respective signal of the signal group is always contained at the same offset in the data packet and without identification and the signal data is accessed by the receiving subscriber component for each signal of the signal group by reading a predetermined number of bytes in the data packet starting from the respective offset and using these read bytes or making them available as the current signal data of the respective signal. For each signal, the offset at which its signal data is stored in a data packet is therefore defined. For example, the "rotation speed" signal may be stored at the offset 16 bytes in the data packet, and it may be provided that 2 bytes are reserved or designated for its signal data. Since the offset and the number of bytes to be read for the signal data of the signal are known, the bytes of the signal data of different signals do not need to be separated by an identifier, since when reading the signal data the number of bytes that must be read at which offset is known. The data packets are therefore compact. This can be stored or saved in a description of the signal group, which can be provided or generated automatically when the signal group is created.

On the other hand, a refinement comprises that in at least one signal group, in the data packets the respective signal data of the signals of the signal group is delimited by a respective signal-specific prefix and/or postfix and the receiving subscriber component finds the respective signal data of at least one signal in the received data packet by searching for the respective prefix and/or postfix and reading in the adjacent signal data. Another conceivable procedure would be to describe a packet data format by embedding signal data in a directory. By searching the directory in the respective data packet or signal buffer, one would arrive at the appropriate offset where the signal data would then be located. Thus, the signal data of a specific signal can be stored at different positions or offsets in the data packet from data packet to data packet, since the position of the signal data of this signal in the data packet can be detected by identifying or searching for a prefix and/or postfix. For example, a prefix and a postfix can each be a predetermined byte pattern. The advantage of using these is that the sequence of signals in the data packet can be changed or varied. In particular, not every signal in every data packet needs to contain signal data. Thus, depending on the signal for which signal data is available, a data packet can accordingly contain only the signal data that has been updated and is available.

One aspect according to the invention is a control device with a processor circuit having at least one computing node, wherein the processor circuit is designed to carry out an embodiment of the method according to the invention. For example, the control device can provide the processor circuit in a single unit housing. The control device with its unit housing may be connected to a communication network of the motor vehicle, for example a CAN bus or an Ethernet network.

The processor circuit may be a data processing device or a processor device. For this purpose, the processor circuit may comprise at least one microprocessor and/or at least one microcontroller and/or at least one FPGA (field programmable gate array) and/or at least one DSP (digital signal processor) as respective computing nodes. One or two or all computing nodes may be realized by an SoC (System on Chip). Furthermore, the processor circuit can comprise program code, which is configured, when executed by the processor circuit, to carry out the embodiment of the method according to the invention. The program code can be stored in a data memory of the processor circuit.

A refinement of the control device comprises that the processor circuit comprises multiple computing nodes, one or more or each of which is a system-on-chip, SoC, and these computing nodes are connected via a system bus and/or an Ethernet network for exchanging signals. In the control device itself, a separate data network can thus be provided, which can be formed by a system bus (for example PCIe or HSSL or AMBA/AXI) or an Ethernet network. The collection buffers and distribution buffers described may be provided or operated.

One aspect according to the invention is a motor vehicle having an embodiment of the control device according to aspects of the invention. The motor vehicle according to an example of the invention may be designed as an automobile, in particular as a passenger car or truck, or as a passenger bus or motorcycle.

Aspects of the invention also include the combinations of the features of the described embodiments. Aspects of the invention thus also include realizations which each have a combination of the features of several of the embodiments described, provided that the embodiments were not described as mutually exclusive.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Reference will now be made in detail to the preferred embodiments, examples of which are illustrated in the accompanying drawings, wherein like reference numerals refer to like elements throughout.

The exemplary embodiments described in the following relate to embodiments of the invention. In the exemplary embodiments, the described components of the embodiments each represent individual features of the invention, which are to be considered independently of each other, and which in each case also further develop the invention independently of each other. Therefore, the disclosure is also intended to include combinations of the features of the embodiments other than those presented. Furthermore, the embodiments described can also be extended to include other features of the invention already described.

In the figures, identical reference signs designate functionally equivalent elements.

Figure 1:
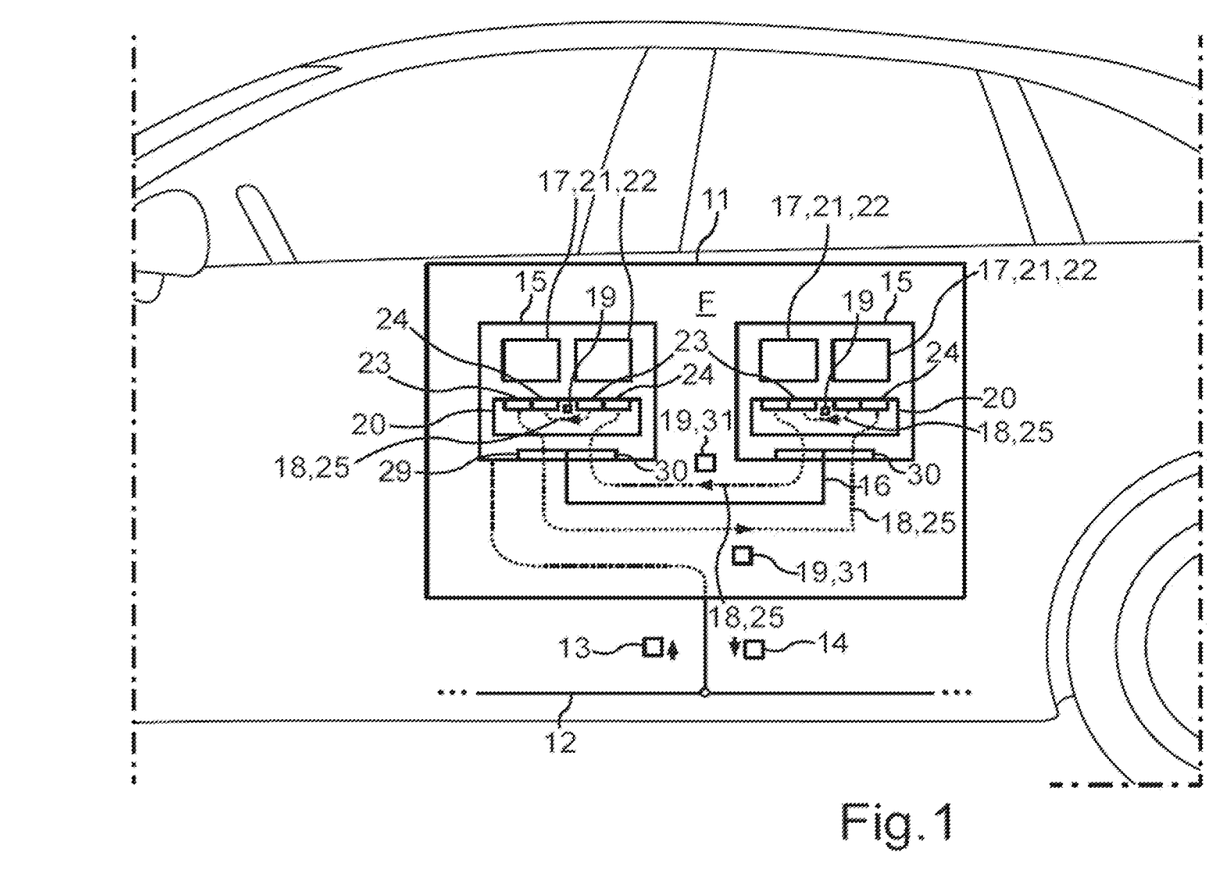
FIG. 1 shows a schematic representation of an embodiment of the motor vehicle according to the invention.

FIG. 1 shows a motor vehicle 10, which may be, for example, a passenger car or truck. In the motor vehicle 10, at least one control device 11 may be provided to provide a vehicle function F in the motor vehicle 10, for example, a driver assistance function such as a distance control and/or a lane departure warning assistant. The control device 11 in the motor vehicle 10 may be connected to a communication network of the motor vehicle 10, for example, to receive sensor data 13 and/or send control commands 14 to at least one actuator of the motor vehicle 10. By the vehicle function F, the control commands 14 can be generated on the basis of the sensor data 13 in order to form the vehicle function F. The control device 11 may itself have at least one sensor and/or at least one actuator to implement the vehicle function F.

For providing the vehicle function F, at least one computing node 15 can be provided in the control device 11, wherein two computing nodes 15 are shown in the example of FIG. 1. A computing node 15 can be, for example, a microprocessor or an SoC, to name only examples. The computing nodes 15 can be connected to each other by a data network 16, which can differ from the communication network 12. For example, the data network 16 may be based on a system bus, such as PCIe or Ethernet. Software components 17 can be implemented in each computing node 15. The software components 17 can be executed for this purpose on one or more processor cores of the computing node 15. The software components 17 can be part of the vehicle function F. For example, one or more software components 17 can process the sensor data 13 according to the vehicle function F and/or generate the control commands 14 according to the vehicle function F. In order for the software components 17 to interact, the software components 17 can exchange signals 18 among one another. The signals 18 can be digital signals, which can be transmitted in sections or piecewise between the software components 17 as respective current signal data 19 in a cyclic or periodic or event-controlled signal transmission by a runtime environment 20 running on the respective computing node 15. A software component 17 which provides signal data in this case constitutes a publisher component 21, and a software component 17 which receives signal data 19 is a subscriber component. Each software component 17 can be both a publisher component 21 and a subscriber component 22. To output the signal data, a publisher component 21 can output its current signal data 19 to be output to an output buffer 23, and to receive current signal data, a subscriber component can receive the signal data from an input buffer 24. For the sake of clarity, only one of these buffers is provided with a reference sign in each case.

The transmission of signal data 19 from the respective output buffer 23 to the input buffer 24 can be carried out by the runtime environment 20 according to a corresponding transmission command, wherein the runtime environment 20 can execute all existing transmission commands, for example cyclically or in an event-controlled manner, repeatedly. Which signal is to be transmitted from which publisher component 21 to which subscriber component 22 can be determined by publisher lists and subscriber lists in the manner described. From these, the respective signal path 25 of the respective signal 18 from a specific publisher component 21 to a specific subscriber component 22 is then obtained. If multiple signal paths 25 from the same publisher component 21 lead to the same subscriber component 22, then the respective signal data 19 of these signals 18 with the same signal path 25 can be grouped together. Signal paths 25 which lead from the same publisher component 21 to the same subscriber component 22 each represent a signal group G which can be used as a basis for the grouping 26.

Figure 2:
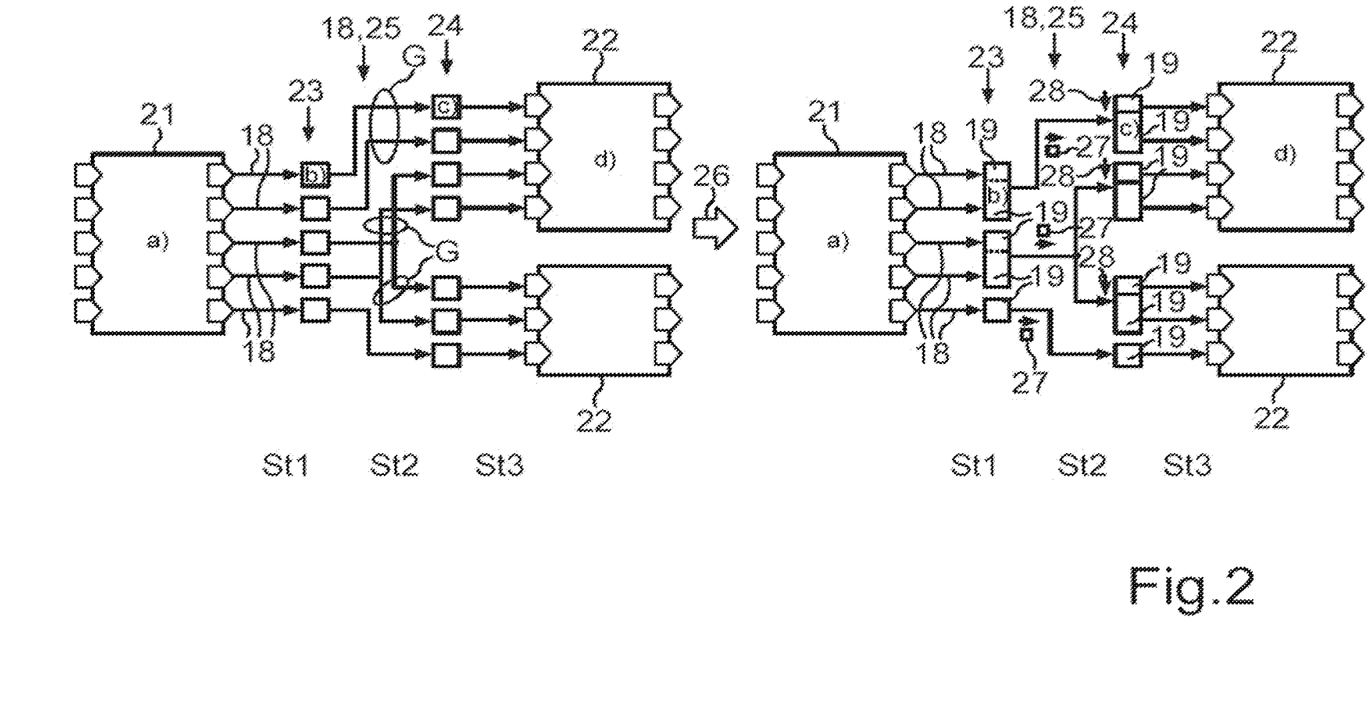
FIG. 2 shows a schematic representation of a control device of the motor vehicle when executing an embodiment of the method according to the invention.

FIG. 2 illustrates the effect of grouping signals. On the left-hand side, a signal transmission without grouping is shown, and after grouping 26, the signal transmission as shown on the right-hand side is obtained, showing how a publisher component 21 describes each of its signals 18 in a single separate output buffer 23, from which a signal path 25 then leads to a corresponding input buffer 24 of a respective subscriber component 22. The transmission from the output buffer 23 to the corresponding input buffer 24 can be carried out by the runtime environment 20, which can be provided, for example, by an operating system of the respective computing node 15. The diagram illustrates that a corresponding plurality of signal paths 25 results, for each of which a separate transmission of the signal data 19 is necessary, which causes a corresponding overhead for each of these transmission operations.

After the grouping 26, output buffers 23 can be provided for the publisher component 21, in which the signal data 19 of multiple signals 18 is combined. Accordingly, the entire output buffer 23 with the signal data 19 of multiple signals 18 along or for the signal path 25 can be transmitted as a common data packet 27. The respective input buffer 24 can be configured or arranged accordingly, so that the data packet 27 can be also written or stored accordingly in the input buffer 24 of the respective subscriber component 22, so that the signal data 19 of multiple signals 18 are also stored or saved there together. The signal data 19 can be assigned to the signals 18, for example, by the fact that they are stored or saved at a fixed offset 28 within the data packet 27 and thus within the input buffer 24. Signal data 19 can also be provided with a prefix or a postfix, such that they can be recognized or identified in the input buffer 24 by searching for the prefix and/or postfix. FIG. 2 illustrates how after the grouping 26, the number of grouped signal paths 25 is lower than before the grouping 26.

FIG. 1 additionally illustrates that signal data 19 can also be transmitted between computing nodes 15 via the data network 16. In this case, the data packets 27 of multiple signal groups G can even be combined.

For this purpose, a collection buffer 29 for collecting or merging data packets 27 or a distribution buffer 30 for distributing the received data packets 27 can be provided in the respective computing node 15. The data packets collected in a collection buffer 29 can then be transmitted between the network components 15 via the data network 16 as a network packet 31. From the distribution buffer 30, the data packets from the network packet 31 can then be divided over or forwarded again to the input buffers 24 of the subscriber components in the manner described in connection with FIG. 2.

Figure 3:
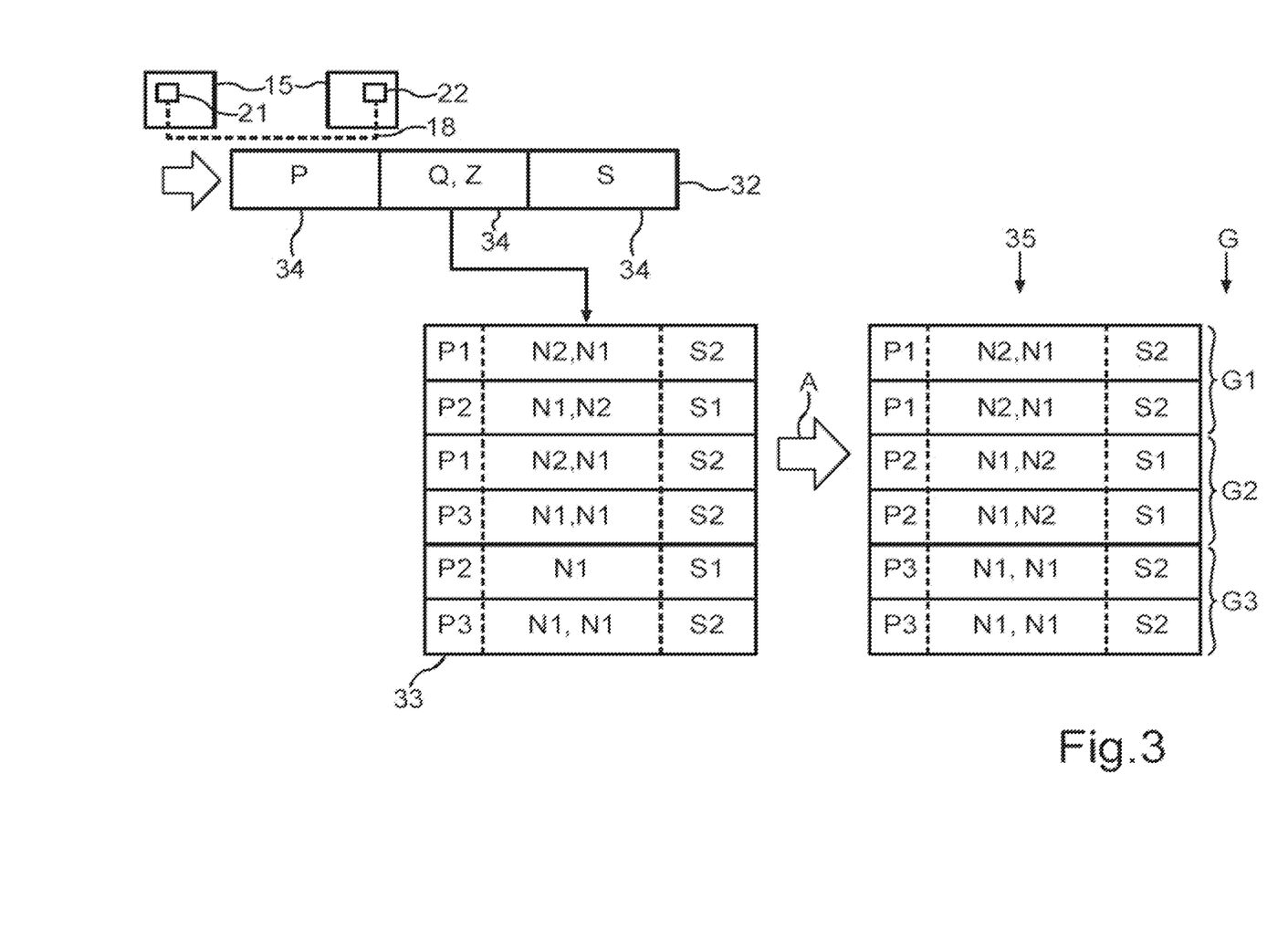
FIG. 3 illustrates an example of how the signal groups G can be automatically determined dynamically when starting or booting up the control device 11.

FIG. 3 illustrates how the signal groups G can be automatically determined dynamically when starting or booting up the control device 11, that is, when a change occurs to the available or existing subscriber components and/or publisher components, the grouping 26 (see FIG. 2) can be carried out again.

FIG. 3 shows once again, for illustration purposes, two computing nodes 15 with publisher components 21 executed therein and a subscriber component 22. Each software component, and hence each publisher component 21 and each subscriber component 22, can be identified by a unique and individual ID, resulting in a provider ID P (P1, P2, P3) and a subscriber ID S (S1, S2, S3), which can be entered into a respective bit field 34 in a signal path tag 32. In addition, it is possible to specify from which computing node 15 as source node Q to which computing node 15 as target node Z a signal 18 is to be transmitted. This can also be entered into a bit field 34. The signal path of the signal 18 results from the comparison of the publisher lists and subscriber lists already described, as is known for the publish/subscribe procedure. The resulting signal path tags for all signal paths can be stored in a list 33 in a data memory, for example, of one of the computing nodes 15. Then a sorting procedure A can sort the signal path tags 32 in the list 33, from which a list 35 of the sorted signal path tags 32 results. Sections G1, G2, G3 can then be identified, which result from a match between the signal path tags 32 or a predefined portion of the signal path tags 32 in the sorted list 35. Each of these sections G1, G2, G3 then corresponds to a signal group G. For each signal path tag 32, the signal 18 to which it belongs can be stored. Accordingly, it can then be provided, for the respective signal, to allocate the output buffer 23 and the input buffer 24 (see FIG. 2) together with the other signals of the same signal group G, such that the output buffers 23 and input buffers 24 shown in FIG. 2 on the right-hand side are obtained for signal data of multiple signals 18

By the second (in the example, middle) bit group 34 for the source nodes Q and the target nodes Z, multiple signal paths can also be identified, which lead from the same computing node as source node Q to the same other computing node as target node Z, even if they belong to different signal groups G.

The proposed solution therefore consists of combining signals 18, which are copied or transmitted in the same way (same signal path or "signal propagation path"), into a group (signal group G), which is then copied or otherwise propagated instead of the individual signals. This means that resources and effort are only required for describing and transmitting a small number of signal groups G, rather than for many individual signals. The more signals 18 that have common transmission paths or signal paths, the greater are the resource savings. The transmission path of a signal 18 is uniquely given by its publisher component as sources (identifiable from the publish entry of a publisher list) and the set of its subscriber components as sinks (identifiable from the subscriber entries of the subscriber lists). The signal groups G can be determined by determining all signal propagation paths and then matching them for all signals. Producer/consumer relations or references can then be created on the basis of the signal groups G. At system runtime, this small number of information items is sufficient to perform a transmission for the entire signal group G.

This can be extended to a two-stage signal grouping to reduce network overhead in a data network. A more advanced measure for this purpose is the further combination of signal groups G which must be transmitted in the same way between the nodes (computing nodes 15) of the control device 11. In other words, signal groups G, which are transmitted to target node Z at the same time and in the same set, can be combined into larger groups. This further reduces the resource expenditure needed to describe and send network packets 31.

The left-hand side of FIG. 2 shows the sequence of the signal data transmission for the case in which this occurs on the basis of individual signals.

(St1) A producing function of the software component a) writes signal output data to the memory areas b) of the publish buffer (St2) The runtime software module transmits signal data from the publish buffer b) of the producer to the subscribe buffer c) of the consumer. This is carried out in individual copy or transmission steps (and is inefficient)

(St3) A consuming function of the software component d) reads input signal data from the memory areas c) of the subscribe buffer.

The right-hand side of FIG. 2 shows the effect of grouping 26 on the same operation, with grouped signals. Step St2 is different: the runtime software module transmits signal group data from b) to c). The number of transmission steps (and thus the resource expenditure) is lower than before.

During the resolution of signal relationships from the publish/subscribe lists, the following information is collected for each occurring signal:

a) the producing software component or function (publisher components)

b) the set of consuming software components or functions (subscriber components)

c) the set of nodes on which the signal of at least one component or function is consumed.

The method for creating signal groups then proceeds as follows:

(1) The grouping information for each signal is collected in a fixed-length data word during the signal relationship resolution phase at the start-up of the control device (signal path tag 32).

(2) The lists of all signal path tags of the publish and subscribe lists of all components or functions are then sorted in ascending order.

(3) Sections with the same signal path tag are read from the sorted list. These correspond to the signals with the same distribution path and thus to the signals to be grouped.

(4) For each signal group thus determined, the necessary signal data memory is allocated and a description of the group and an instruction for the necessary data transmission is created and appended to a list ("copy list" or "send list").

The data memory or working memory for the signal path tags (list 33) is only required for these during steps (1) to (3) and can be reused in step (4) for storing the grouping information Overall, the idea thus describes a method for reducing resource consumption in the signal data transmission at runtime of a distributed control device, in which signal communication relationships are defined in the form of publish/subscribe lists. The reduction is achieved by grouping of signal data and is to be compared to a Pub/Sub-based transmission method without grouping.

The signal grouping is therefore carried out not only for bus communication, but also for signals that are transmitted solely between individual software functions on the control device/node (in AUTOSAR this is the RTE layer, as opposed to a conventional Com-Stack layer). The method also performs sorting based on information collected from other nodes (processor systems of the control device) at start-up, namely the publisher component as the signal source (source component/runnable) and the set of subscriber components as signal sinks (target components/runnable set). This results in a signal grouping optimized for the particular composition of components in the computing nodes. In particular, the grouping is performed automatically based on information collected about the signal propagation path in a multi-SoC control device.

The idea is aimed at the level of individual software functions within a multi-SoC electronic control unit (ECU), or electronic control device, both the communication between software components in the same node and communication between nodes in that ECU. In a two-stage dynamic Pub/Sub procedure with a discovery phase, special data items (relating to the actual signal propagation paths) are used: the signal path tags. This allows a more efficient signal grouping to be performed than with static data.

The method performs sorting based on information that can be collected from other computing nodes (processor systems of the control device) at start-up, namely the signal source (source component/runnable) and the set of the signal sinks (target components/runnable set). This results in a signal grouping optimized for the particular composition of components in the nodes.

Overall, the examples show how automatic signal grouping can be performed in an AUTOSAR RTE on the basis of signal distribution paths.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for a runtime-based configuration of a device-internal signal transmission in a control device, wherein in a runtime environment upon start-up of the control device, publisher components each provide at least one publisher list of the signals provided by them and subscriber components each provide at least one subscriber list of the signals required by them, the method comprising:

for each subscriber component
for the signals required by said component, determining which signal path from one of the publisher components to the subscriber component the respective signal must take through the control device for given publisher lists;
for those of the required signals for which an identical signal path is identified, defining a signal group by storing a common transmission command in the runtime environment for the signals of the respective signal group;
during cyclical execution of the stored transmission commands of the subscriber components by the runtime environment, transmitting current signal data of the signals of each signal group as a common data packet from the respective publisher component to the respective subscriber component of the signal group;

operating multiple computing nodes in the control device;
connecting the multiple computing nodes via a data network; and
for multiple signal paths, which lead from the same computing node as a source node to the same other computing node as a target node, providing a collection buffer in the source node and a distribution buffer in the target node, collecting the current signal data for each of the multiple signal paths in the collection buffer, and transmitting the collected current signal data in a common network packet to the distribution buffer and from the distribution buffer onward to the at least one subscriber component determined by the identified signal paths, such that
data packages of the multiple signal groups are collected in the collection buffer and transmitted over the data network as the network package to the distribution buffer of the same target node and from the distribution buffer, the data packets of the individual signal groups are then transmitted separately from each other again to the respective subscriber component.

2. The method as claimed in claim 1, further comprising:
to determine the signal groups,
constructing a signal path tag for each of the signal paths as a fixed-length data word, which specifies in a first bit field the publisher component, in a second bit field the computing nodes on which the subscriber components are executed, and in a third bit field the subscriber component,
sorting the signal path tags of all signal paths in a data memory by a sorting procedure,
identifying sections of identical signal path tags, or sections in which a predetermined part of the signal path tag matches, in the data memory, and
defining one of the signal groups in each case based on the identified sections.

3. The method as claimed in claim 1, further comprising:
to determine the signal groups,
constructing a signal path tag for each of the signal paths as a fixed-length data word, which specifies in a first bit field the publisher component, in a second bit field the computing nodes on which the subscriber components are executed, and in a third bit field the subscriber component,
sorting the signal path tags of all signal paths in a data memory by a sorting procedure, identifying sections of identical signal path tags, or sections in which a predetermined part of the signal path tag matches, in the data memory, and defining one of the signal groups in each case based on the identified sections.

4. The method as claimed in claim 2, further comprising: using a hash procedure which generates an output of the same length regardless of the number inputs to form at least one of the bit fields.

5. The method as claimed in claim 3, further comprising: using a hash procedure which generates an output of the same length regardless of the number inputs to form at least one of the bit fields.

6. The method as claimed in claim 1, further comprising: for each identified signal group, allocating in a data memory an output buffer for the associated publisher component and an input buffer for the associated subscriber component, writing, by the publisher component, respective current signal data of the signal group cyclically into the output buffer, generating the respective current data packet in the output buffer, transmitting, by the runtime environment, the data packet to the input buffer, and reading in, by the subscriber component, the signal data of the data packet from its input buffer or providing, to the subscriber component, the signal data of the data packet with said data for reading in.

7. The method as claimed in claim 1, further comprising: for each identified signal group, allocating in a data memory an output buffer for the associated publisher component and an input buffer for the associated subscriber component, writing, by the publisher component, respective current signal data of the signal group cyclically into the output buffer, generating the respective current data packet in the output buffer, transmitting, by the runtime environment, the data packet to the input buffer, and reading in, by the subscriber component, the signal data of the data packet from its input buffer or providing the signal data of the data packet with said data for reading in.

8. The method as claimed in claim 2, further comprising: for each identified signal group, allocating in a data memory an output buffer for the associated publisher component and an input buffer for the associated subscriber component, writing, by the publisher component, respective current signal data of the signal group cyclically into the output buffer, generating the respective current data packet in the output buffer, transmitting, by the runtime environment, the data packet to the input buffer, and reading in, by the subscriber component, the signal data of the data packet from its input buffer or providing the signal data of the data packet with said data for reading in.

9. The method as claimed in claim 3, further comprising: for each identified signal group, allocating in a data memory an output buffer for the associated publisher component and an input buffer for the associated subscriber component, writing, by the publisher component, respective current signal data of the signal group cyclically into the output buffer, generating the respective current data packet in the output buffer, transmitting, by the runtime environment, the data packet to the input buffer, and reading in, by the subscriber component, the signal data of the data packet from its input buffer or providing the signal data of the data packet with said data for reading in.

10. The method as claimed in claim 4, further comprising: for each identified signal group, allocating in a data memory an output buffer for the associated publisher component and an input buffer for the associated subscriber component, writing, by the publisher component, respective current signal data of the signal group cyclically into the output buffer, generating the respective current data packet in the output buffer, transmitting, by the runtime environment, the data packet to the input buffer, and reading in, by the subscriber component, the signal data of the data packet from its input buffer or providing the signal data of the data packet with said data for reading in.

11. The method as claimed in claim 5, further comprising: for each identified signal group, allocating in a data memory an output buffer for the associated publisher component and an input buffer for the associated subscriber component, writing, by the publisher component, respective current signal data of the signal group cyclically into the output buffer, generating the respective current data packet in the output buffer, transmitting, by the runtime environment, the data packet to the input buffer, and reading in, by the subscriber component, the signal data of the data packet from its input buffer or providing the signal data of the data packet with said data for reading in.

12. The method as claimed in claim 1, wherein in the case of at least one signal group, in the data packets thereof, including the signal data of the respective signal of the signal group at the same offset in the data packet and without identification, and accessing the signal data by the receiving subscriber component for each signal of the signal group by reading a predetermined number of bytes in the data packet starting from the respective offset and using these read bytes or making them available as the current signal data of the respective signal.

13. The method as claimed in claim 1, wherein in the case of at least one signal group, in the data packets thereof, including the signal data of the respective signal of the signal group at the same offset in the data packet and without identification, and accessing the signal data by the receiving subscriber component for each signal of the signal group by reading a predetermined number of bytes in the data packet starting from the respective offset and using these read bytes or making them available as the current signal data of the respective signal.

14. The method as claimed in claim 2,
wherein in the case of at least one signal group,
in the data packets thereof, including the signal data of the respective signal of the signal group at the same offset in the data packet and without identification, and
accessing the signal data by the receiving subscriber component for each signal of the signal group by reading a predetermined number of bytes in the data packet starting from the respective offset and using these read bytes or making them available as the current signal data of the respective signal.

15. The method as claimed in claim 3,
wherein in the case of at least one signal group,
in the data packets thereof, including the signal data of the respective signal of the signal group at the same offset in the data packet and without identification, and
accessing the signal data by the receiving subscriber component for each signal of the signal group by reading a predetermined number of bytes in the data packet starting from the respective offset and using these read bytes or making them available as the current signal data of the respective signal.

16. The method as claimed in claim 1, further comprising:
for at least one signal group in the data packets, delimiting the respective signal data of the signals of the signal group by a respective signal-specific prefix and/or postfix and finding, by the receiving subscriber component, the respective signal data of at least one signal in the received data packet by searching for the respective prefix and/or postfix and reading in the adjacent signal data, or defining a predetermined packet data format by embedding signal data in a directory.

17. A control device having a processor circuit with at least one computing node, wherein the processor circuit is configured to carry out a method as claimed in claim 1.

18. A control device having a processor circuit with at least one computing node, wherein the processor circuit is configured to carry out a method as claimed in claim 1, and wherein the processor circuit comprises multiple computing nodes, one or more or each of which is a System-on-Chip, SoC, and these computing nodes are connected via a system bus and/or an Ethernet network for exchanging signals.

19. A motor vehicle having a control device having a processor circuit with at least one computing node, wherein the processor circuit is configured to carry out a method as claimed in claim 1.

20. A method for a runtime-based configuration of a device-internal signal transmission in a control device, wherein in a runtime environment upon start-up of the control device, publisher components each provide at least one publisher list of the signals provided by them and subscriber components each provide at least one subscriber list of the signals required by them, the method comprising:
when the control device is started, creating the signal paths by a software routine checking all publish and subscribe entries of all components, comparing them with each other and for each subscribe entry, identifying and linking the associated publish entry,
for each subscriber component
for the signals required by said component, determining which signal path from one of the publisher components to the subscriber component the respective signal must take through the control device for given publisher lists;
wherein the signal path is uniquely given by its publisher component as sources identified from the publish entry of a publisher list and the set of its subscriber components as sinks identified from the subscriber entries of the subscriber lists;
for those of the required signals for which an identical signal path is identified, defining a signal group by determining all signal propagation paths and then matching them for all signals and by storing a common transmission command in the runtime environment for the signals of the respective signal group; and
during cyclical execution of the stored transmission commands of the subscriber components by the runtime environment, transmitting current signal data of the signals of each signal group as a common data packet from the respective publisher component to the respective subscriber component of the signal group.

* * * * *